United States Patent
Zahnert et al.

(10) Patent No.: US 8,497,840 B2
(45) Date of Patent: Jul. 30, 2013

(54) COMPUTER PERIPHERAL FOR SCANNING

(75) Inventors: Martin Georg Zahnert, Zurich (CH); Erik Fonseka, Zurich (CH); Alexander Ilic, Zurich (CH)

(73) Assignee: Dacuda AG, Zurich (CH)

( * ) Notice: Subject to any disclaimer, the term of this patent is extended or adjusted under 35 U.S.C. 154(b) by 412 days.

(21) Appl. No.: 12/732,038

(22) Filed: Mar. 25, 2010

(65) Prior Publication Data

US 2011/0234497 A1    Sep. 29, 2011

(51) Int. Cl.
*G06F 3/033* (2006.01)
*G09G 5/08* (2006.01)

(52) U.S. Cl.
USPC ........................................................ 345/166

(58) Field of Classification Search
USPC ........................................................ 345/166
See application file for complete search history.

(56) References Cited

U.S. PATENT DOCUMENTS

| | | | |
|---|---|---|---|
| 4,767,923 A | 8/1988 | Yuasa | |
| 4,804,949 A | 2/1989 | Faulkerson | |
| 4,906,843 A | 3/1990 | Jones et al. | |
| 5,355,146 A * | 10/1994 | Chiu et al. | 345/156 |
| 5,578,813 A | 11/1996 | Allen et al. | |
| 5,611,033 A | 3/1997 | Pitteloud et al. | |
| 5,909,209 A | 6/1999 | Dickinson | |
| 5,994,710 A * | 11/1999 | Knee et al. | 250/557 |
| 6,344,846 B1 * | 2/2002 | Hines | 345/166 |
| 6,348,981 B1 | 2/2002 | Walsh | |
| 6,392,632 B1 | 5/2002 | Lee | |
| 6,429,422 B1 | 8/2002 | Bohn | |
| 6,513,717 B2 | 2/2003 | Hannigan | |
| 6,525,306 B1 | 2/2003 | Bohn | |
| 6,648,483 B1 * | 11/2003 | Kuo | 359/857 |
| 6,710,768 B2 | 3/2004 | Muranami | |

(Continued)

FOREIGN PATENT DOCUMENTS

| | | |
|---|---|---|
| EP | 0 277 964 B1 | 4/1993 |
| EP | 1 126 404 A1 | 8/2001 |

(Continued)

OTHER PUBLICATIONS

Brown, "A Survey of Image Registration Techniques," ACM Computing Surveys, vol. 24, No. 4, Dec. 1992.

(Continued)

*Primary Examiner* — Quan-Zhen Wang
*Assistant Examiner* — Nelson D Runkle, III
(74) *Attorney, Agent, or Firm* — Wolf, Greenfield & Sacks, P.C.

(57) ABSTRACT

A computer peripheral that may operate as a hand-held scanner and, in some embodiments, also as a conventional computer mouse. The components incorporated in the device to support scanning may be compact and may be positioned to allow flexibility in shaping a housing of the device. As a result, the device may be ergonomically shaped to facilitate hand-held use as either a scanner or a mouse. Controls, for mouse or scanner operation, may be readily incorporated into the device. The components may also be low cost. Such a low cost, compact design may be achieved through an appropriate selection of curved reflective surfaces in optical paths through the housing. The curved reflective surface may selectively focus or spread light traveling along an optical path, reducing or eliminating the need for lenses and may enable light emitting elements and an image array to be mounted on the same printed circuit board.

20 Claims, 7 Drawing Sheets

U.S. PATENT DOCUMENTS

| | | |
|---|---|---|
| 6,783,069 B1 | 8/2004 | Hecht et al. |
| 7,119,816 B2 | 10/2006 | Zhang et al. |
| 7,123,292 B1 | 10/2006 | Seeger et al. |
| 7,133,068 B2 | 11/2006 | Fisher et al. |
| 7,317,448 B1 | 1/2008 | Sasselli et al. |
| 7,424,218 B2 | 9/2008 | Baudisch et al. |
| 7,439,954 B2 | 10/2008 | Theytaz et al. |
| 2002/0190953 A1 | 12/2002 | Gordon et al. |
| 2004/0028295 A1 | 2/2004 | Allen et al. |
| 2004/0141157 A1* | 7/2004 | Ramachandran et al. ...... 353/70 |
| 2004/0189674 A1 | 9/2004 | Zhang et al. |
| 2005/0057510 A1 | 3/2005 | Baines et al. |
| 2005/0231482 A1* | 10/2005 | Theytaz et al. ............... 345/166 |
| 2005/0248532 A1 | 11/2005 | Moon et al. |
| 2008/0130077 A1* | 6/2008 | Park et al. ..................... 359/202 |
| 2009/0032600 A1 | 2/2009 | Lapstun et al. |
| 2009/0060283 A1 | 3/2009 | Bledsoe et al. |
| 2009/0080035 A1 | 3/2009 | Downs |
| 2011/0234497 A1* | 9/2011 | Zahnert et al. ................ 345/166 |

FOREIGN PATENT DOCUMENTS

| | | |
|---|---|---|
| EP | 1 164 538 A2 | 12/2001 |
| WO | WO-03091868 A1 | 11/2003 |
| WO | WO 2007/029903 A1 | 3/2007 |

OTHER PUBLICATIONS

Lucas et al., "An Iterative Image Registration Technique with an Application to Stereo Vision," Proceeding of Imaging Understanding Workshop, pp. 121-130 (1981).

Nakao, T. et al., "An Image Input Unit Using Digital Mosaic Processing," NEC Research and Development, vol. 40, No. 2, Apr. 1, 1999, pp. 259-266.

"DIY Mouse Scanner," Jul. 20, 2007, http://www.diylive.net/index.php/2007/07/20/diy-mouse-scanner/>.

European Search Report and Written Opinion from corresponding European Publication No. EP2254325 dated Aug. 31, 2010.

International Preliminary Report on Patentability from International Application No. PCT/EP2011/053768 dated Mar. 9, 2012.

* cited by examiner

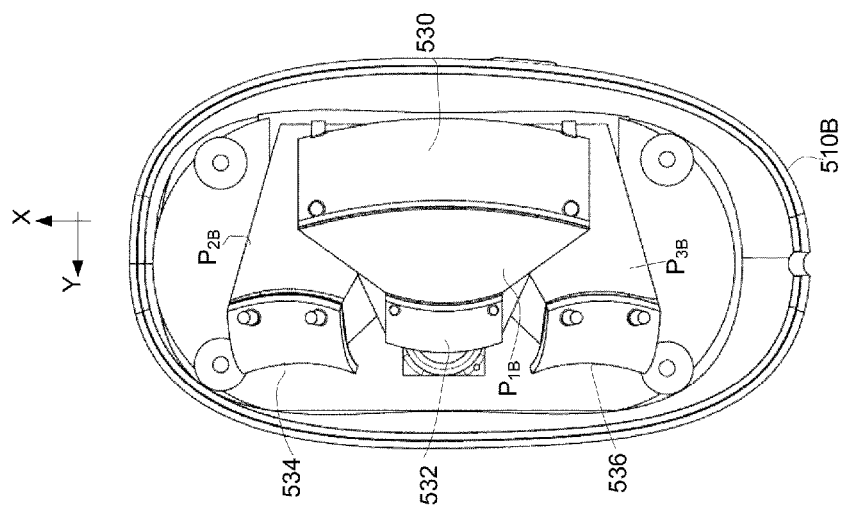
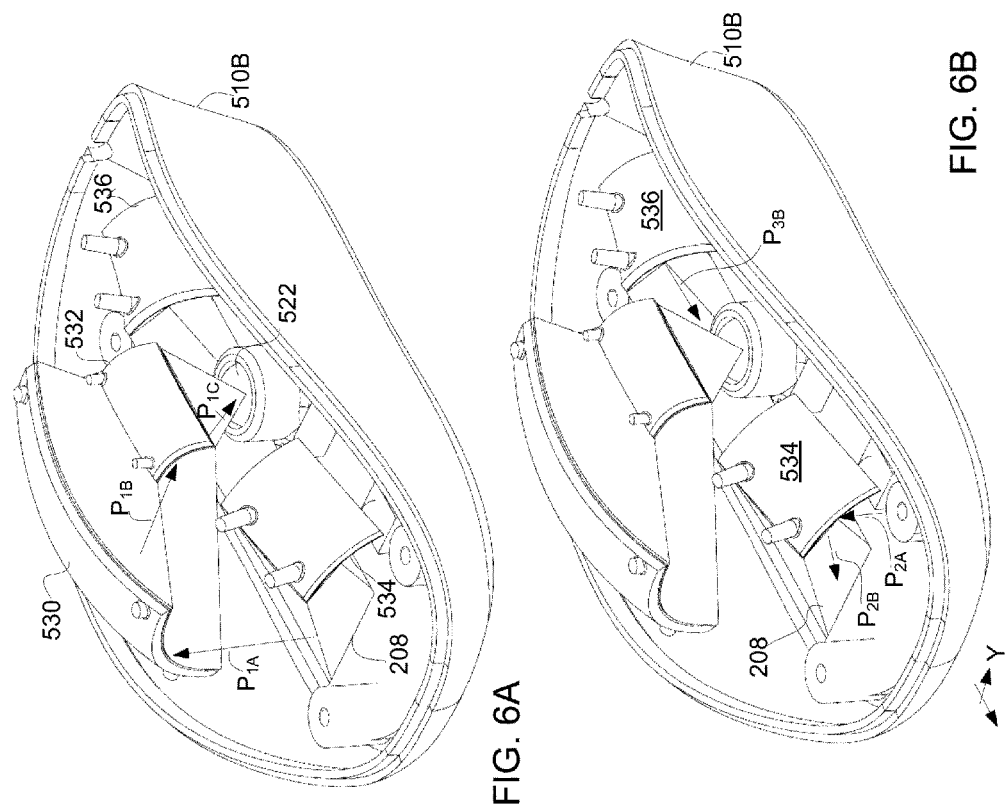

COMPUTER PERIPHERAL FOR SCANNING

BACKGROUND

1. Field of Invention

This application relates generally to handheld computer-related devices that can be adapted to act as image scanners and more specifically to forming composite images from image frames generated by such handheld computer-related devices.

2. Related Art

Image scanners are frequently used in business and even home settings. A scanner can acquire, in digital form, an image of an object. Generally, the scanned object is flat, such as a document or a photograph. Once scanned, the image can be manipulated (e.g., rotated, cropped and color balanced), processed (e.g., copied to be pasted elsewhere) and further handled such as attached to an e-mail, sent over a telephone line as a fax or printed as a copy.

A scanner includes an image array, but the image array is generally smaller than the object to be scanned. The scanner can nonetheless acquire an image of the entire object because there is relative motion of the image array and the object during scanning. During this time of relative motion, the output of the image array represents different portions of the object at different times. As the scanner moves relative to the object, successive outputs of the image array are captured and then assembled into an image representing the entire item.

In some scanners, such as a flatbed scanner, the object to be scanned is held in a fixed position. The scanner is constructed such that the image array is mechanically constrained to move only along a predefined path relative to that fixed position. As a result, information about the relative position of the object and the image array can be used to position the successive outputs of the image array within an image such that the image accurately represents the object being scanned.

Other scanners are handheld such that mechanical constraints on the movement of the image array relative to the object to be scanned may be reduced. However, application of handheld scanners may still be limited by some constraints. For example, some handheld scanners may be constrained to move in only one or two directions when pressed against a surface containing an object to be scanned. As in a flatbed scanner, successive outputs of the image array are captured and assembled into an image. Though, without mechanical constraints imposed on relative motion of the image array and the object being scanned, accurately assembling successive outputs of the image array into an image is more complicated.

In some instances, handheld scanners are intended to only be effective on relatively small items, such as business cards, so that there are a relatively small number of outputs to be assembled into the image. In other instances, use of a handheld scanner is cumbersome, requiring a user to move the scanner in a predetermined pattern. For example, a user may be instructed to move the scanner across the object so that the output of the image array represents parallel strips of the object that can be relatively easily assembled into a composite image. In other cases, the output of handheld scanner is simply accepted as imperfect, appearing fuzzy or distorted as a result of the successive outputs of the image array being inaccurately assembled into an image.

SUMMARY

A computer peripheral that may be used as a scanning device may be implemented through the use of one or more curved reflective segments to provide one or more compact optical paths within a housing of the device.

In some embodiments, an apparatus for use as a hand-held scanner comprises a housing defining a window, a light emitting component adapted and configured to emit light to illuminate the window, an image array, and a concave reflective segment coupled to the housing in a location such that the concave reflective segment redirects and focuses light passing through the window in an optical path to the image array.

In other embodiments, there is provided an apparatus for use as a scanner-mouse. The apparatus comprises a housing comprising a lower surface, the lower surface having a window formed therein, and a circuit assembly comprising an upper surface, an image array disposed on the upper surface, and a light emitting element disposed on the upper surface. The apparatus also comprises a first reflective segment within the housing, the first reflective segment being shaped and positioned to reflect and focus light passing through the window in an optical path to the image array and a second reflective segment within the housing, the second reflective segment being shaped and positioned to reflect and spread light from the light emitting element in the optical path to the window.

In further embodiments, there is provided a component for use in a computer peripheral for use as a scanner-mouse. The component comprises a top surface, side walls extending from the top surface, the top surface and side walls bounding a cavity, with edges of the side walls defining an opening to the cavity, a first concave reflective segment disposed within the cavity, a second concave reflective segment disposed within the cavity; a first convex reflective segment disposed within the cavity, and a second convex reflective segment disposed within the cavity.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 6A is a sketch illustrating an optical path from a window to an image array in a scanner mouse according to some embodiments;

FIG. 6B is a sketch illustrating optical paths from light-emitting elements to a window in a housing of a scanner-mouse according to some embodiments;

FIG. 6C is a top view of a scanner-mouse illustrating the optical paths shown in FIGS. 6A and 6B;

DETAILED DESCRIPTION

The inventors have recognized and appreciated that a handheld scanning device may be implemented by incorporating components that provide compact optical paths within a housing for the device. By providing compact optical paths, significant flexibility is enabled for the size and shape of the exterior housing, allowing the housing to be ergonomically designed to fit in a human hand. The flexibility allows controls to be integrated into exterior surfaces of the housing. Such controls may be used to provide functionality when the device is used for scanning, but also to allow the device to be operated in a mouse mode in which it performs functions of a conventional computer mouse.

In some embodiments, compact optical paths are provided through the use of curved reflective segments. The curved reflective segments may comprise concave portions, which tend to focus the light traveling along an optical path. The curved reflective segments may comprise convex portions, which tend to spread the light traveling along an optical path. In some embodiments, the curved reflective segments may have compound curves such that they provide reflective surfaces that are concave in some dimensions and convex in others.

Through appropriate selection of the curvature of the segments, light from light emitting elements may be directed towards a window through which an object is imaged. The light may be spread uniformly across the window, without the need for expensive lenses. Conversely, curved reflective elements may be used to redirect and focus light reflecting from the object being imaged so that the light strikes an image array. Through appropriate selection and positioning of curved reflective elements, an image of an object within the window may be projected on the image array, without the need for a lens or with a lens of low refractive power, which may be obtained relatively inexpensively.

The curved reflective components may be positioned such that both the light emitting elements and the image array can be mounted on an upper surface of the same printed circuit board. Integrating components in this fashion further reduces cost and provides for more space within the interior of the housing than would result from using a separate assembly to mount light emitting elements.

When these techniques are applied in a scanner-mouse, the scanner-mouse can be coupled to a computer using known techniques for connecting computer peripherals to a computer. Image processing techniques may be implemented by programming a computer to which the scanner mouse is coupled. A scanned image may be rendered to a user of the scanner-mouse using a display for the computer. Though, it should be appreciated that it is not a requirement that a composite image formed using techniques as described herein be displayed to a user. In some embodiments, the composite image may be passed to software applications or other components within or coupled to the computer for processing.

Figure 1:
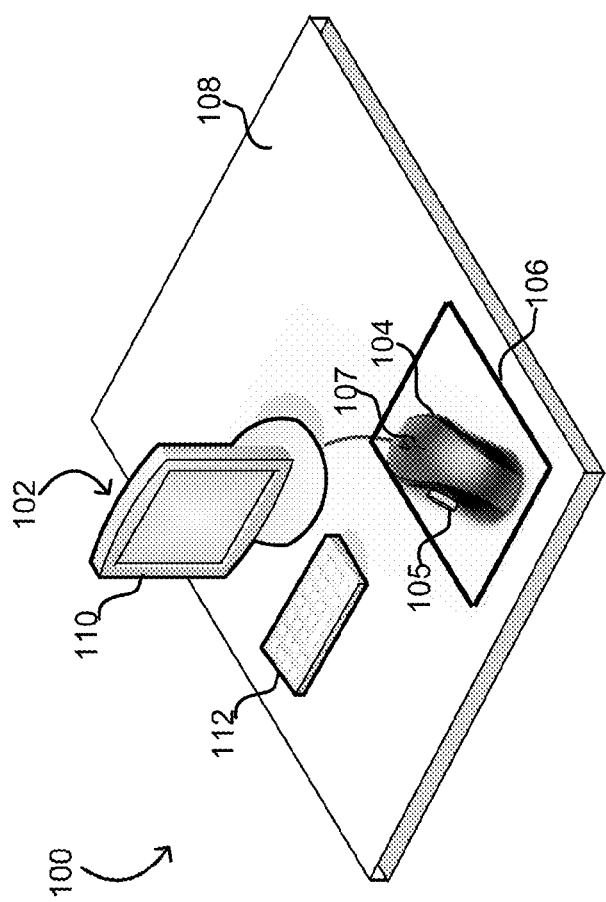
FIG. 1 is a sketch of an environment in which some embodiments of the invention may be implemented.

Turning to FIG. 1, an example is provided of a system 100 employing techniques as described herein. System 100 comprises a computer 102, a scanning device is coupled to the computer and an object 106 to be scanned. FIG. 1 shows as an example of a scanning device scanner-mouse 104, which is here shown coupled to computer 102 as a computer peripheral.

Components of system 100 may be supported on any suitable surface 108. In this example, surface 108 is a flat horizontal surface, such as a desk or a table. Such a surface is suitable for scanning objects, such as pieces of paper containing text or photographs. Though, it is not a requirement that all of the components of the system be supported on the same surface or even that the surface be horizontal or flat. It is also not a requirement that the object be paper.

Object 106 may be of any suitable size, type and may comprise any suitable content. For example, the content of object 106 may be of any textual, image or graphical form or a combination thereof. In addition, the content of object 106 may be of any gradient. As regards a size of the scanned object, it may vary from, for example, a business or credit card or smaller to a document of dimensions that are equal to or exceed 4 inches per side. Moreover, in some embodiments, object 106 may comprise a piece of paper that is larger than 7 inches by 10 inches or a much larger object such as a poster.

Computing device 102 may be any suitable computing device, such as a personal computer. Scanner-mouse 104 may be coupled to computing device 102 via any suitable wired or wireless connection. For example, a Universal Serial Bus (USB) connector may be employed to couple computer mouse 104 to computing device 102. Processing of images collected by scanner-mouse 104 and visualization of results of the processing may be controlled via, for example, one or more processors of computing device 102, as discussed in more detail below.

In some embodiments of the invention, image stitching, comprising creating a composite image from a stream of image frames captured by the scanning device as an object is scanned, may be performed by any suitable components of computing device 102. Both coarse positioning of the image frames and a subsequent finer alignment of the image frames to generate a final composite image may be performed within computing device 102. Though, in some embodiments, information on the image frames comprising positional and rotational data and image data may be pre-processed in the scanning device in any suitable way. Further, in some embodiments, some or all of the steps of the image stitching process may be performed within the scanning device such as scanner-mouse 104. In yet further embodiments, generation of the composite image may be performed in a server or other computing device coupled to a computer 102 over a network or otherwise geographically remote from scanner-mouse 104. Accordingly, the processing of the image frames may be apportioned in any suitable way between the scanner-mouse computer peripheral and one or more computing devices.

System 100 comprises the scanning device which is, in this example, incorporated into a computer mouse and is therefore referred to as scanner-mouse 104. Object 106 placed on supporting surface 108 may be scanned by moving scanner-mouse 104 over object 106 in any suitable manner. In particular, in accordance with some embodiments of the invention, motion of scanner-mouse is not constrained within the plane defined by surface 108 and a person moving scanner-mouse 104 may move it freely back and forth over object 106 until the entire object is scanned.

FIG. 1 illustrates an example of a scanning device that provides functionalities of both a computer mouse and a scanner. Scanner-mouse 104 may be characterized by a size, look, and feel of a conventional computer mouse so that the device may be easily used by different users and in any setting. Though, embodiments of the invention are not limited to any particular size, dimensions, shape and other characteristics of the scanning device.

In this example, scanner-mouse 104 may comprise a button 105 that enables a user to switch between a scanner mode and a mouse mode. In the scanner mode, scanner-mouse 104 operates as a scanner, while in the mouse mode the scanning device functions as a pointing device commonly known as a computer mouse. Button 105 may be incorporated in a body of scanner-mouse 104 in any suitable manner. In this example, button 105 incorporated in the body of scanner-mouse 104 in a location that would be below a thumb of the user grasping the mouse. Because scanner-mouse 104 incorporates the functionality of a conventional computer mouse, the device may comprise any other input elements such as a wheel, one or more buttons, or keys, and others, collectively indicated in FIG. 1 as elements 107. Though, it should be appreciated that scanner-mouse 104 may comprise any suitable elements as embodiments of the invention are not limited in this respect.

In some embodiments, depressing button 105 may place scanner-mouse 104 in a scanning mode in which it generates image data in conjunction with navigation information indicating position of the scanner-mouse 104 at times when the image data was acquired. Depressing button 105 may also generate a signal to computer 102 to indicate that image data representing a scan of an object is being sent. Releasing button 105 may have the opposite result, reverting scanner-mouse 104 to a mode in which it generates conventional mouse navigation data and appropriately signaling computer 102 of the changed nature of the data generated by scanner-mouse 104.

Though, it should be appreciated that any suitable control mechanism may be used to switch between modes. Button 105 may be omitted in some embodiments of the invention. Accordingly, the switching between the scanner and mouse modes may be performed via any suitable alternative means. Thus, any components suitable to receive user input for switching between the modes may be employed. For example, in some embodiments, the switching between the scanner and mouse modes may be performed via computing device 102. In such scenarios, any suitable control included within a user interface of display device 110 may be used to accept input instructing scanner-mouse 104 to switch between the mouse and scanner modes. In addition, in some embodiments, scanner-mouse 104 may automatically switch between the scanner and mouse modes in response to a trigger. An example of a trigger may be associated with a determination that the scanning device is placed over an object (e.g., a document) to be scanned. Also, the scanning device may automatically switch between the modes based on certain characteristics of the scanned object.

As shown in FIG. 1, computing device 102 may be associated with any suitable display device 110. Display device 110 may include a monitor comprising a user interface. The user interface may be, for example, a graphical user interface which accepts user inputs via devices, such as a computer keyboard 112 and scanner-mouse 104 used in a mode as a conventional computer peripheral. It should be appreciated that system 100 may comprise any other suitable components which are not shown for simplicity of representation. Display device 110 may be used to present to the user an image of object 106 as object 106 is being scanned. During scanning, display 110 may depict portions of object 106 that have been traced over by movement of scanner-mouse 104. Such a display may be rendered quickly such that the user perceives the display being "painted" in real-time during scanning. In addition, display 110 may present a final image is formed through the scanning.

Computing device 102 may comprise image manipulation software so that a user may make modifications to or otherwise process a displayed composite image. Such processing that may be effectuated in any fashion and via any suitable means. Accordingly, the user may be enabled to control the way in which the composite image is presented on the display device. For example, the user may instruct that the composite image be presented to the user in an enlarged form. Alternatively, when the object being scanned is large (e.g., a poster), a respective composite image may be displayed at a smaller scale. Furthermore, the composite image may be presented in a modified form automatically, for example, to suit a particular application or in response to characteristics of the scanned object.

In addition, in some embodiments, a suitable component of computing device 102 may be used to adjust a size of the composite image displayed on display device 110. The size of the composite image may be adjusted in accordance with a way in which the user moves the scanning device over the object being scanned. Further, the user may be allowed (e.g., via a user interface) to select any suitable format for the composite image, which may be performed during the scanning process or at any other suitable time. Moreover, in some embodiments, the size of the composite image may be adjusted (e.g., cropped, skewed or scaled) to provide an aspect ratio and/or size suitable to a known page format such as, for example, ANSI A, ANSI B and any other suitable formats.

In embodiments in which the scanning device can operate in a scanning mode and as a convention computer peripheral, such as a mouse, scanner-mouse 104 may comprise any suitable components for it to operate as a conventional computer peripheral. In addition, scanner-mouse 104 has an image capture capability and may therefore output image data representing object 106 being scanned as a sequence of successive image frames. Accordingly, scanner-mouse 104 includes components for capturing image frames of an object, which may include a light source, an image array and suitable optical elements such as lenses and mirrors to provide optical paths between the light source and object 106 and between object 106 and the image array.

Figure 2:
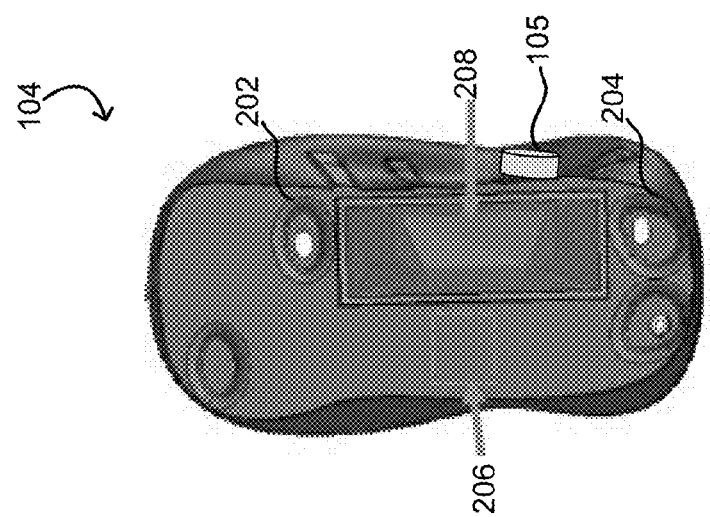
FIG. 2 is a sketch of a bottom view of a scanner-mouse computer peripheral in which some embodiments of the invention may be implemented.

FIG. 2, illustrating a bottom surface of scanner-mouse 104, shows a scan window 208 through which the image sensor located within a body of scanner-mouse 104 may capture image frames of a scanned object (e.g., object 106 shown in FIG. 1). Scanner-mouse 104 may comprise any suitable image capturing device which may capture image frames. In some embodiments of the invention, the image capturing device may be a two-dimensional image array, such as a CCD array as is known in the art of still and video camera design. A location of the image array within scanner-mouse 104 is shown schematically in FIG. 2 as a box 206. Though, it should be recognized that the image array will be positioned in an optical path from light passing through window 208. The image array may be positioned directly in the optical path or may be positioned in the optical path as reflected using one or more reflective devices.

In addition, scanner-mouse may provide position information in conjunction with image data. Accordingly, scanner-mouse 104 may comprise navigation sensors shown in FIG. 2 as sensors 202 and 204. Sensors 202 and 204 may comprise sensors as known in the art (e.g., laser sensors) of mouse design. Though, the scanning device in accordance with some embodiments of the invention may comprise any suitable number of navigation sensors of any type.

Each of the navigation sensors 202 and 204 separately senses a motion of scanner-mouse 104 in x and y directions, which may be taken as two orthogonal directions in the plane defined by the lower surface of scanner mouse 104. As a result, a rotation of scanner-mouse 104 in that plane, denoted as Θ, may be derived either in scanner-mouse 104 or in computing device 102 from outputs of navigation sensors 202 and 204

In some embodiments, navigation sensors 202 and 204 may be positioned at an adjacent window 208. This positioning may help ensure that when the scanning device is placed on an object being scanned such as a piece of paper, the navigation sensors do not protrude beyond the edges of the piece of paper. Nevertheless, the distance between the navigation sensors may be set to be large enough for the navigation sensors to be able to calculate rotational displacement of the scanning device with sufficient resolution. Accordingly, FIG. 2 illustrates navigation sensors 202 and 204 on opposing sides of window 208. Though, any suitable positioning of such sensors may be used.

Alternatively or additionally, other types of sensors may be included in scanner-mouse 104. As an example of another variation, instead of or in addition to laser sensors used to implement navigation sensors 202 and 204, scanner-mouse 104 may comprise other types of sensors that can collect navigation information, nonlimiting examples of which include one or more accelerometers, gyroscopes, and inertial measurement unit (IMU) devices. In addition to navigation information, such sensors may provide information on the user's current activity and may signify motion of the scanner-mouse that triggers operations relating to scanning. For example, a rapid back and forth movement, detected by a repeated, alternating high acceleration detected by such sensors, may be interpreted as a user input that ends the scanning process and discards an image acquired.

As an example of another variation, a contact sensor that may enable a rapid and reliable detection of the scanning device being lifted may be included. An output of a sensor indicating that scanner-mouse 104 has been lifted off a page being scanned may trigger an end or restart of a scanning process. In some embodiments, a contact image sensors (CISs) may be implemented as additional optical components, a light source and an image sensor incorporated into one module. Though, it should be appreciated that outputs of an image array that captures image frames of an object being scanned may similarly indicate that the scanner-mouse has been lifted.

It should be appreciated that scanner-mouse 104 may further comprise other components that implement mouse and scanner functionalities of the scanning device. Thus, scanner-mouse 104 may comprise a processor, memory, a power supply, a light source, various optical elements, a USB interface, and any other suitable components. The bottom surface of scanner-mouse 104 shown in FIG. 2 may also comprise pads, as known in the art, to aid in sliding the scanner-mouse.

Figure 3:
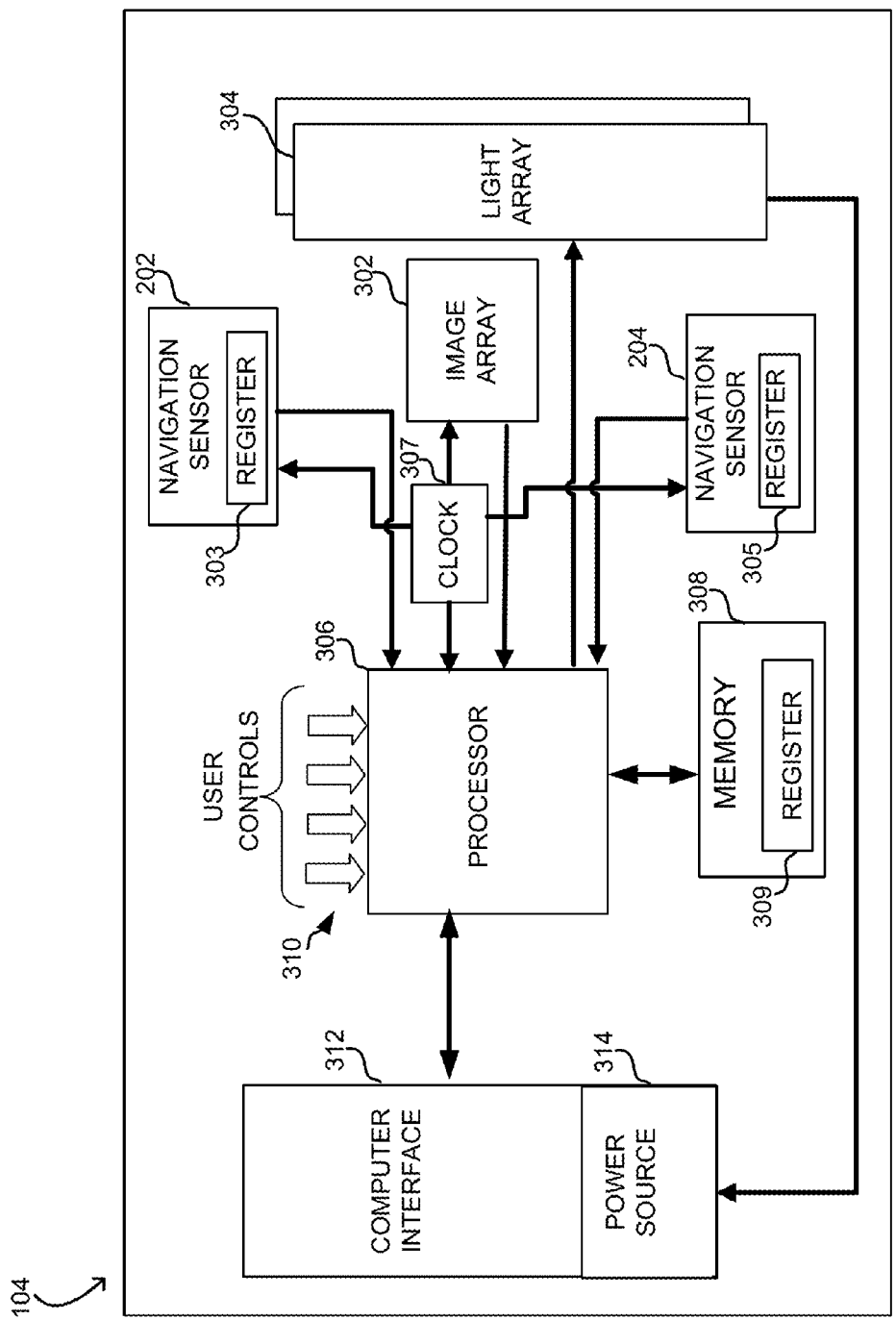
FIG. 3 is a functional block diagram of components of the scanner-mouse computer peripheral in which some embodiments of the invention may be implemented.

FIG. 3 illustrates an example of components of scanner-mouse 104, which may serve as a scanning device in accordance with some embodiments of the invention. Scanner-mouse 104 may comprise one or more sensors of any suitable types used to collect navigation information relating to position and orientation (rotation) movements of scanner-mouse 104 along a support surface (e.g., surface 108). In the example illustrated, the sensors comprise two navigation sensors such as sensors 202 and 204. The navigation sensors 202 and 204 output indication of movements of scanner-mouse 104.

Scanner-mouse 104 also comprises one or more image sensors which are shown by way of example only as an image array 302. The image array 302 may be a two-dimensional matrix of sensing elements, which may be of any suitable type. Though, it should be appreciated that any suitable image sensor may be utilized. Image array 302 may be positioned in box 206 (FIG. 2) in order to capture images of objects visible through window 208.

Further, scanner-mouse 104 may comprise a light source which is represented here by way of example only as light array 304. Light array 304 may comprise one or more arrays or Light Emitting Diodes (LED) or other suitable light emitting components. Additionally, scanner-mouse 104 may comprise optical components, which are not shown for simplicity of representation. The optical components, such as lens module(s), may provide an optical path. Any suitable systems of mirrors, prisms and other components may form the optical path to direct light from light arrays 304 through window 208 and to receive light from an object to be image through window 208 and direct it to image array 302.

In some embodiments, light array 304 may be configured such that the light reaching window 208 provides uniform illumination over window 208. Though, if uniform illumination is not achieved, suitable calibration techniques may be used. Also, light array 304 and image array 302, and the optical components creating optical paths between those components and window 208, may be arranged in such a way that the optical path for the incident light does not interfere with the optical path to the image array 302.

Various user controls 310 coupled to processor 306 may be used to receive user input for controlling operation the scanner-mouse 104. User controls 310 may comprise, for example, one or more keys, a scroll wheel (e.g., input elements 107 shown in FIG. 1) and an input element for switching between the mouse and scan modes (e.g., button 105 in FIG. 1).

Operation of scanner-mouse 104 may be controlled by processor 306. Processor 306 may be any suitable processor, including a microcontroller, a Field Programmable Gate Array (FPGA), Application Specific Integrated Circuit (ASIC) or any other integrated circuit, collection of integrated circuits or discrete components that can be configured to perform the functions described herein.

Processor 306 may be configured to perform the functions described herein based on computer-executable instructions stored in a memory 308. Memory 308 may be part of the same component as processor 306 or may be a separate component. Computer-executable instructions in memory 308 may be in any suitable format, such as microcode or higher level instructions. In some embodiments, though, memory 308 may be achieved by a circuit configuration that provides fixed inputs.

Accordingly, components of scanner-mouse 104 may be coupled to processor 308. Thus, it may be that processor 306 may receive and respond to an input indicating that the scanner-mouse 104 should switch between the mouse mode and scan mode. Additionally, processor 306 may receive and respond to inputs from various sensors (e.g., the image sensors such as image array 302, navigation sensors 202 and 204 and others).

Processor 306 may also generate control signals that turn on light array 304 and trigger image array 302 to capture an image frame. In some embodiments, these actions may be synchronized such that light array 304 is on while image array 302 is capturing an image, but off otherwise to conserve power.

Processor 306 may store, process and/or forward to other image data. In some embodiments, processor 306 may temporarily buffer image data in memory 308. Accordingly, memory 308 may represent one or more types of storage media, and need not be dedicated to storing computer-executable instructions such that memory 308 may alternatively or additionally store image data acquired from image array 302.

The image array 302 may be controlled to acquire image frames of the scanned object at a frame rate that allows acquiring overlapping image frames even when a user moves the rapidly scanner-mouse over the scanned object. In some embodiments, the frame rate and an angle of view may be adjustable. These settings may together define a size of an overlapping area of two sequential image frames.

In some embodiments, image array 302 is controlled to capture an image frames at a rate of about 60 frames per second. A frame rate of 60 frames per second may be employed in an embodiment in which the optical system captures an image frame represent an area of an object 106 (FIG. 1) that has a smallest dimension on the order of about 1.5 cm. Based on physics of human motion, that suggest a human is unlikely to move scanner mouse 104 at a rate faster than approximately 0.4 m/sec, such parameters provide an overlap from one image frame to a next image frame of at least 50%. Such an overlap may ensure reliable registration of one image frame to a next, which may be used as a form of coarse positioning of image frames. As a specific example, image array 302, and the optical components (not shown), may be adapted to capture image frames representing an area of object 106 having a minimum dimension between 1 cm and 5 cm. Such a system may operate at a frame rate between about 30 frames per second and about 100 frames per second. Though, any suitably sized array may be used with any suitable frame rate.

It should be appreciated that image array 302 may be triggered to capture images in any suitable manner. Scanner-mouse 104 may comprise any suitable component or components that keep track of time and determines times when images are captured. Accordingly, in the example illustrated, scanner-mouse 104 may comprise control circuitry that includes clock 307, which may be a component as is known in the art, that generates signals that control the time at which one or more operations with scanner-mouse 104 are performed. In the embodiment illustrated, clock 307 is shown coupled to image array 302 and may control image array 302 to capture images at periodic time intervals. In some embodiments, operation of other components, such as navigation sensors 202 and 204 and processor 306, may also be controlled by clock 307. Navigation sensors 202 and 204 may receive a signal from clock 307 that triggers the navigation sensors to record navigation information at a periodic rate. Additionally, clock 307 may provide a signal to processor 306 that controls processor 306 to read navigation information from the sensors 202 and 204 close to a time at which image array 302 is triggered to capture an image. Though, the specific control circuitry used to time the functions performed by scanner-mouse 104 is not critical to the invention. In some embodiments, for example, operation of image array 302 may be controlled by processor 306 so that processor 306 triggers image array 302 to capture an image. Also, it should be appreciated that, though FIG. 3 shows a separate clock 307, timing functions may alternatively or additionally be provided by processor 306.

In some embodiments, processor 306 may be part of the control circuitry that synchronizes operations of the components of scanner-mouse 104. As a specific example, conventional navigation sensors include one or more registers that store values representing detected motion since the last reset of the register. Such position registers are illustrated as registers 303 and 305 in FIG. 3. Processor 306 may generate control signals to reset position registers 303 and 305 associated with navigation sensors 202 and 204, respectively, at any suitable time. In some embodiments, processor 306 may reset the registers each time an image frame is captured. In this way, the values output by navigation sensors 202 and 204, which are derived from the position registers 303 and 305, may indicate movement of scanner mouse 104 between successive image frames. In other embodiments, processor 306 may generate control signals to reset position registers 303 and 305 at times when respective values are read from the registers, which may occur more frequently than when an image frame is read out of image array 302. Regardless of when registers 303 and 305 are read and reset, processor 306 may maintain information indicating motion of the scanner mouse relative to its position at the start of a scan, regardless of the number of image frames read. This cumulative position information may be stored in memory 308. In the example of FIG. 3, memory 308 is shown to have a register 309 holding this cumulative position information. In this example, each navigation sensor is shown to have a register and cumulative position information is shown stored in a register. This representation is used for simplicity. Navigation sensors 202 and 204, for example, may separately store navigation information associated with motion in the x-direction and the y-direction. Accordingly, more than one register may be present.

Regardless of the memory structure used to store such navigation information, when processor 306 reads the values from registers 303 and 305, the values may be used to update the values in register 309 to reflect any additional motion of the scanner mouse since the last update of the cumulative position register 309.

Within the scanner mouse 104, each image frame may be associated with navigation information that may be passed to computing device 102 for use in determining a coarse position of the image frame within a composite image to be formed. That navigation information may be in any suitable form. For example, navigation information may be expressed as frame to frame changes in position of each of the navigation sensors 202 and 204, from which a relative pose between frames can be determined. Though, it should be appreciated that relative poses could be computed in scanner mouse 104 and provided as the navigation information. Alternatively, in some embodiments, cumulative position information may be provided as the navigation information. In such embodiments, the computing device may compute frame to frame changes in position of the navigation sensors 202 and 204 based on changes in cumulative position information. From these values, relative poses between frames could be computed. Such an approach may be beneficial if there is a risk of dropped frames when image frames are transmitted through computer interface 312. Regardless of the specific format of the navigation information, information collected by processor 306 may be provided to another device, such as computer 102 (FIG. 1) for any suitable processing. That processing may include generating a composite image displaying it on a display device. Though, in some embodiments, the composite image may be at least partially created within the scanning device.

Accordingly, processor 306 may communicate with other devices through an interface, such as computer interface 312. Scanner-mouse 104 may be coupled to a computing device, such as, for example, computing device 102, and, in the example illustrated, computer interface 312 may implement communications between scanner-mouse 104 and computing device 102. Processor 306 may control selection of such information from the image and navigation sensors, forming the selected information into data packets and transmission of the data packets, via computer interface 312, to computing device 102. Accordingly, computer interface 312 may receive the data packets comprising data such as images captured by image and navigation sensors of scanner-mouse 104 and transmit the data to computing device 102 as the data is received. In the embodiment illustrated, computer interface 312 may represent a conventional computer interface for connecting computer peripherals to a computing device. As a specific example, computer interface 312 may be components implementing a USB interface.

Computer interface 312 may also be used to transfer control signals from the computing device to the scanning device. For example, a signal instructing a selection of the mouse mode or the scan mode may be sent from the computing device to the scanner-mouse computer peripheral. Alternatively or additionally, processor 306 may send command or status information through computer interface 312.

Computer interface 312 may alternatively serve as a source of power to energize components of the scanning device. As a specific example, a USB connection includes leads that, per the USB standard, supply up to 500 microAmps of power. Though, in some embodiments, the scanning device may communicate wirelessly with the computing device. In such scenarios, the scanning device may be powered by battery. In addition, the scanning device may be powered in any suitable manner, including via means combining wired and wireless functionalities.

In this example, light array 304 is connected to power source 314, which draws power through computer interface 312. In some embodiments, light arrays 304 require more power than can be supplied through computer interface 312. Accordingly, light arrays 304 may be strobed only while an image is being captured. Strobing may reduce the average power. To provide an appropriate power when light arrays 304 are on, power source 314 may contain an energy storage device. As a specific example, power source 314 may contain a 1000 microFarad capacitor that is charged from computer interface 312 and discharged to supply power when light array 304 is strobed.

Figure 4:
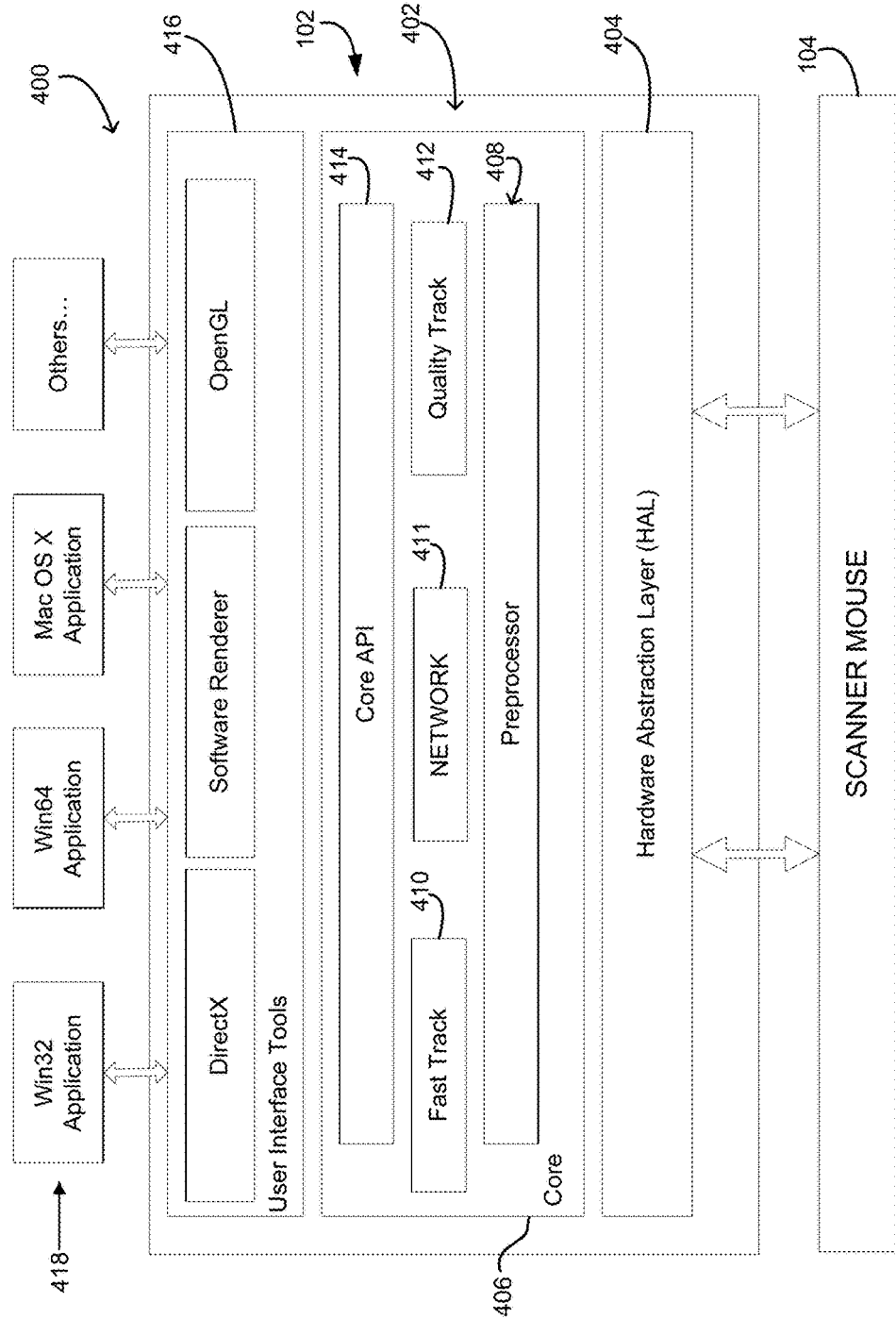
FIG. 4 is a schematic diagram of a system for image processing, in accordance with some embodiments of the invention.

The components illustrated in FIG. 3 may be operated in a scan mode, in which scanner-mouse 104 is moved over a scanned object and a stream of image frames is acquired. The image frames may be passed to a computing device for processing into a composite image. The composite image may be used by different applications. FIG. 4 illustrates an exemplary system 400 that may generate and use a composite image.

In this example, scanner-mouse 104 may be coupled with computing device 102. It should be appreciated that any suitable scanning and computing devices may be used as embodiments of the invention are not limited in this respect. Moreover, some embodiments of the invention may be implemented in a device incorporating functionalities of both the scanning device and the computing device as described herein.

In the example illustrated, computing device 102 may comprise framework 402 which comprises any suitable components having computer-executable instructions for implementing functions as described herein. In framework 402, a hardware abstraction layer 404 may operate as an interface between the physical hardware of computer and software components. In embodiments in which scanner mouse 104 communicates over a standard computer interface, HAL 404 may be a component of a conventional operating system. Though, any suitable HAL may be provided.

At a higher level, framework 402 comprises core 406 that may perform processing of image and navigation information as described to generate a composite image. Core 406 may comprise a preprocessor 408 for preprocessing the image and navigation information, which may be performed in any suitable manner. For example, preprocessing may entail extracting features from image frames to support feature-based image matching. Though, preprocessor 408 may preprocess image data and navigation information in any suitable way.

The preprocessed information may be the basis for processing to provide coarse and fine positioning of image frames. In the example illustrated in FIG. 4, a component 410 denoted by way of example only as "Fast track" of core 406 may perform the coarse positioning of image frames. Core 406 also comprises a component 412 denoted by way of example only as "Quality track" which may perform the fine positioning of image frames.

In some embodiments, successive image frames collected during a scan of an object are represented as a network 411 stored as a data structure in computer memory. The data structure may be configured in any suitable way to represent each image frame as a node in network 411. Edges between each pair of nodes may represent relative positioning of the image frames. Initially, nodes may be added to network by fast track 410 as image frames are received from scanner mouse 104. The initial edges in the network may be based on relative positions which may be derived from coarse positioning information generated by fast track processing 410. However, quality tack processing 412 may access network 411 and make fine adjustments to the edges in the network.

In some embodiments, processing in fast tack 410 is independent of processing in quality tack 412. Moreover, processing in quality track 412 can be performed without the entire network being constructed. Accordingly, fast tack processing 410 and quality tack processing 412 may be performed in separate processes. Separate processes may be implemented using features of computer systems as are known in the art. Many conventional computer systems have operating systems that provide separate processes, sometimes called "threads." In embodiments in which computer 102 contains a multi-core processor, each process may execute in a separate core. Though, it is not a requirement that fast tack 410 and quality tack 412 processing be performed in separate cores or even in separate processes.

Upon completion of processing of all image frames of a scan, network 411 may contain a final composite image, representing scanned object 106. A position can be assigned to each node in the network based on the position information defined by the edges of the network. Thus, the composite image can be represented by the collection of the image frames in positions indicated in the network. The edges in the network may be directional to preserve the order in which image frames were acquired. Accordingly, in embodiments in which an later image frame partially or totally overlaps an earlier image frame, the portion of the composite image where there is overlap may be represented by the most recently acquired composite image. Though, any suitable approach may be used to determine the content of a composite image when image frames overlap. The overlapping portions of the image frames, for example, could be average on a pixel-by-pixel basis.

Further, it should be appreciated that during scan operation, network 411 contains a representation of a composite image. Though, the image frames may be imprecisely positioned relative to each other, creating a blurring or jagged appearance to the composite image, if displayed.

To allow the composite image to be used outside of core 406 or to allow components outside of core 406 to control the image generation processes, core 406 may communicate with other components via a core application programming interface API 414.

In FIG. 4, framework 402 may also comprise user interface tools 416 providing different functionalities related to processing a composite image generated by core 406. These user interface tools may directly interface with a user, such as through a graphical user interface. Though, such user interface tools may interact with applications that in turn are interacting with a user or a running in response to actions by a user.

User interface tools 416 may be perform any suitable functions. An example of one tool may be a renderer, here implemented in software. Render may access network 411, through API 414 and render a composite image on a user interface of any suitable display, such as display 110. The renderer may render a completed composite image. Though, in some embodiments, renderer may continuously update the display as image frames are being added to network 411 by fast track processing 410 and image frames are adjusted in the network by quality tack processing 412. In this way, a user operating a scanning mouse may see the progress of the scan—which areas of an object have been scanned and which areas remain to be scanned.

In addition to rendering a composite image for a user, user interface tools 416 may receive user inputs that control operation of core 406. For example, user inputs may trigger a scan, end a scan, reset a scan or discard a scanned image. Further, in some embodiments, user inputs may control the size or aspect ratio of a scanned image or otherwise input values of parameters used in operation of core 406.

User interface tools 416 may be implemented in any suitable way to perform any suitable functions. In this example, components implemented according to DirectX and OpenGL are shown by way of example only. User interface tools 416 may comprise components implemented in any suitable way.

Moreover, user interface elements may exchange image data and commands with applications, rather than directly with a human user. A composite image of the scanned object may be utilized by any suitable application executed by computing device 102 or any other suitable device. The applications may be developed for any suitable platforms. In the example of FIG. 4, applications 418 such as Win32 application, Win64 application, Mac OS X application and "Others . . . " are shown by way of example only. Though, it should be appreciated that any suitable applications may utilize the composite image generated using techniques described herein as embodiments of the invention are not limited in this respect.

Framework 402 may operate in conjunction with any suitable applications that can utilize and/or further process the composite image in any suitable way. Different applications that can be stored in memory of computing device 102 or be otherwise associated with computing device 102 (e.g., via the Internet) may enable processing of the image information to extract any suitable information. Thus, some of such applications may determine context and other different properties of the image information. The image information may also be analyzed to extract and process content of the image, which may involve identifying whether the image comprises a business or a credit card, pictures, notes, text, geometric shapes or any other elements. Any suitable text and image recognition applications may be utilized. Further, any suitable statistical information on the image content may be extracted.

In scenarios where the image information on the scanned object comprises text, suitable applications may detect certain information in the text and provide the user with additional information related to the text. For example, in one embodiment, an application may identify certain words in the text, for example, those that are not included in a dictionary, and obtain information relating to these words (e.g., via the computing device connected to the Internet). The application can also identify the relevance of word groups, sentences and paragraphs, which may then by highlighted on the composite image via any suitable means. As another example, a suitable application may detect literature references in the text, and, in response, the references may also be obtained via the Internet. Thus, a composite image generated by framework 402 may be used in any suitable way, and the manner in which it is used is not critical to the invention.

Though scanner-mouse 104 could be assembled by packaging components as are known in the art for implementing a mouse in the same housing as components as are known in the art for implementing a handheld scanner, a scanner-mouse assembled in this fashion may have undesirable characteristics for use as a computer peripheral. The inventors have recognized and appreciated that merely combining conventional components leads to a device that is too large to be comfortably held within the hand of a computer user. A need to provide space within the peripheral for optical paths may further limit options for shaping an exterior housing of the device. A housing for a computer peripheral may enclose an optical path between a window through which an object being imaged is visible and an image array. One or more optical paths may also be provided between one or more light emitting elements and the window. Providing a housing that encloses these optical paths, if the optical paths are implemented using conventional components, tends to limit the ergonomic appeal of such a device. Further, a design combining conventional components may be relatively costly to produce, both because of the cost of some of the components individually and because of the cost of assembly of these components.

Figure 5B:
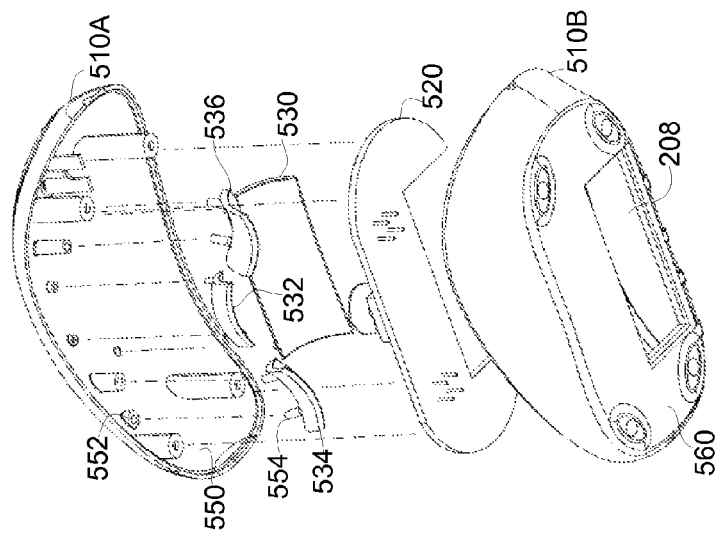
FIG. 5B is an alternative view of the scanner-mouse of FIG. 5A.
Figure 5A:
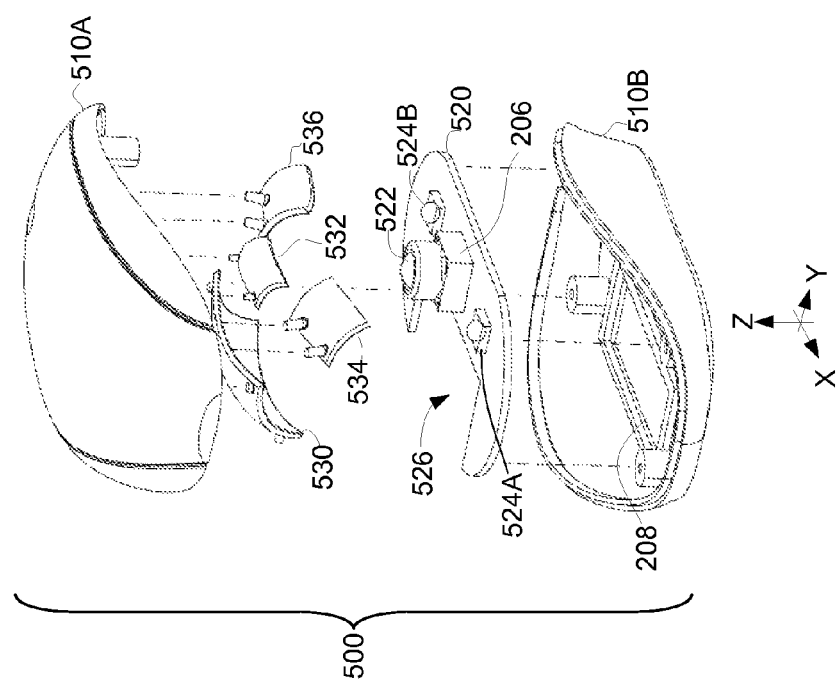
FIG. 5A is a sketch, partially exploded, of an embodiment of a scanner-mouse.

FIG. 5A illustrates a scanner-mouse 500 that uses a relatively small number of components for capturing images when scanner-mouse 500 operates in scan mode. These components are packaged to fit within a compact housing that is similar in size and shape to the housing of a conventional mouse that does not include scan capabilities. For example, the entire assembly may be on the order of 15 cm in the dimension illustrated as the X direction in FIG. 5A and 8-10 cm in the dimension illustrated as the Y direction and on the order of 10 cm in the direction illustrated as the Z direction.

In the embodiment illustrated, scanner-mouse 500 includes a curved reflective segment to form an optical path between window 208 and image array 302. In the illustrated embodiment, multiple curved reflective segments 530 and 532 provide a compact optical path between window 208 and image array 302. Curved reflective segments may also be used to provide compact optical paths between each of light emitting elements 524A and 524B and window 208. In this embodiment, light emitting elements 524A and 524B perform the function of light array 304 (FIG. 3) of illuminating objects within window 208.

These components are packaged within a housing, which in this example is shown to have an upper outer housing portion 510A and a lower outer housing portion 510B. Though, a housing may be assembled from any suitable number of components. Each of the upper outer housing portion 510A and lower outer housing portion 510B may be molded from plastic using techniques as are known in the art. Though, any suitable techniques may be used for forming the housing. When scanner-mouse 500 is assembled, upper outer housing portion 510A and lower outer housing portion 510B may be held together in any suitable way, including through the use of an adhesive, snap fit elements that interlock when the portions are pressed together or screws or other fasteners.

Regardless of how outer housing portions 510A and 510B are held together, when assembled, they may enclose components for forming images of an object visible through window 208. The housing may provide mechanical support for these components in a format that can easily fit within a human hand so that a human user may move the scanner-mouse to operate it as a conventional mouse or as a scanning device. The housing may serve other functions. It may protect the optical components from dust or environmental contamination. In addition, it may block ambient light, other than the light traveling along an intended optical path from window 208, from reaching image array 302.

Upper outer housing portion and lower outer housing portion 510B may be shaped to incorporate exterior features as in a conventional mouse. Upper outer housing portion 510A may include one or more buttons that a user may "click." Other user controls, such as a wheel, may also be incorporated in either upper outer housing portion 510A or lower outer housing portion 510B such that they are accessible on the exterior surfaces of outer housing of scanner-mouse 500. However, such conventional components are not illustrated for simplicity.

The housing portions may also enclose one or more of the components illustrated in FIG. 3 as forming a portion of a scanner-mouse. The included components may, among other functions, output navigation information as in a conventional mouse. Other components as in a conventional mouse may also be included. For example, though not shown in FIG. 5A, a cable may be used to couple scanner-mouse 500 to a computer. Alternatively, in some embodiments, a wireless transmitter/receiver may be included in scanner-mouse 500 to support wireless communication rather than communication over a cable.

For simplicity, FIG. 5A shows only components related to optical paths through the housing of scanner-mouse 500. Other components, such as those that interface to a computer or control operation of scanner mouse 500 in scan mode are not expressly shown. However, according to some embodiments, those components may be mounted on a circuit assembly that also contains components used in forming images in scan mode.

In the embodiment of FIG. 5A, scanner-mouse 500 includes a circuit assembly holding components for controlling operation of scanner mouse 500, interfacing to a computer as well as for capturing images. In the embodiment of FIG. 5A, the circuit assembly is implemented as printed circuit board 520. In addition to image array 302 and lighting elements 524A and 524B, circuit components illustrated in FIG. 3 included on printed circuit board 520 may include processor 306, memory 308 and computer interface 312.

Though not shown in FIG. 5A, navigation sensors, such as navigation sensors 202 and 204 may be electrically coupled to processor 306 of circuit board 520, such as through wires. Navigation sensors 202 and 204 may be attached to lower housing portion 510B so as to position the navigation sensors adjacent a lower surface 560 (FIG. 5B) of scanner-mouse 500 when scanner-mouse 500 is placed against a surface, such as surface 108 (FIG. 1).

In this example, printed circuit board 520 is the only printed circuit board within scanner-mouse 500. One way in which a low-cost, compact scanner-mouse is implemented in some embodiments is by providing optical paths that allow components that illuminate window 208 and that capture an image of an object within window 208 to be mounted on a single printed circuit board, such as printed circuit board 520. Mounting the components on a single side of printed circuit board 520 may further reduce cost. As can be seen in FIG. 5A, light emitting elements 524A and 524B along with image array 302 are mounted on the upper surface of printed circuit board 520. This arrangement is made possible in part through the use of curved reflective segments 530, 532, 534 and 536.

In operation in scan mode, to acquire an image, light emitting elements 524A and 524B are energized so that they emit light. Light emitting elements 524A and 524B may be turned on by processor 306 or controlled in any other suitable way. The light from light emitting element 524A impinges upon reflective segment 534. That light is redirected from reflective segment 534 towards window 208. Similarly, light from light emitting element 524B impinges on reflective segment 536. From reflective segment 536, the light is redirected towards window 208. The positioning of light emitting elements 524A and 524B in combination with the curved shape of reflective segments 534 and 536 provides a relatively uniform illumination across window 208.

In this example, window 208 is elongated in the direction illustrated as the X direction by the legend in FIG. 5A. To provide a relatively uniform illumination, reflective segments 534 and 536 are shaped to spread light from light emitting elements 524A and 524B, respectively, along the X direction. For this purpose, reflective segment 534 is convex if viewed in cross section in a plane parallel to the X-Z plane as illustrated in the legend of FIG. 5A. Reflective segment 536 is similarly convex. As a result, a small number of light emitting elements may be used to provide adequately uniform illumination across window 208. In this example, two light emitting elements are shown. Though, it should be recognized that in some embodiments, a single light emitting element may be used or more than two light emitting elements may be used.

Regardless of the specific number of light emitting elements used, having a small number of light emitting elements allows them to be physically placed on printed circuit board 520, even though printed circuit board 520 includes components to perform other functions for a scanner-mouse. The redirection provided by reflective segments 534 and 536 enables the light emitting elements 524A and 524B to be on the upper surface of printed circuit board 520, even though it is parallel to the lower surface of lower housing portion 510B containing window 208.

With this configuration, printed circuit board 520 includes a cutout region 526 such that light from light emitting elements on the upper surface of printed circuit board 520 may pass through window 208 below printed circuit board 520. Though, other shapes and mounting configurations for printed circuit board 520 may also be suitable.

The spreading in the beams of light emitted by light emitting elements 524A and 524B allows a relatively short optical path between light emitting elements 524A and 524B and window 208. A short optical path may be achieved without lenses over light emitting elements 524A and 524B. Though, in some embodiments, lenses may be used. If lenses are used, spreading provided by convex reflective segments 534 and 536, allows the use of lenses that have lower refractive power than if reflective segments 534 and 536 were not convex. Because lenses with higher refractive power generally are more expensive than lenses of similar quality with lower refractive power, the ability to use lenses of lower refractive power may reduce the overall cost of scanner-mouse 500, even if a lens is employed. Though, even further cost reduction may be possible if lenses are omitted entirely.

Curved reflective segments 534 and 536 may have complex curves to shape the beams of light from light emitting elements 524A and 524B to generally match the shape of window 208. In the embodiment illustrated, curved reflective segments 534 and 536 are convex in a plane parallel to the X-Z direction but are not convex in a transverse direction, such as in cross-section in a plane parallel to the Y-Z plane illustrated in the legend of FIG. 5A. To the contrary, reflective segments 534 and 536 are concave in cross-section in planes parallel to the Y-Z plane. The concave nature of the cross-section focuses light from light emitting elements 524A and 524B, respectively, as it is redirected towards window 208.

In this example, reflective segments 534 and 536 are convex in the X-Z dimension and concave in the Y-Z dimension such that light from light emitting elements 524A and 524B has a generally rectangular pattern that conforms to the rectangular shape of window 208. Because window 208 is elongated in the X dimension, spreading of illumination in the X direction leads to more uniform illumination. Focusing in the Y direction increases the percentage of the energy emitted by light emitting elements 524A and 524B impinging on window 208, while still providing uniform illumination in the Y direction. One of skill in the art will recognize that the radii of curvature of reflective segments 534 and 536 may be selected to achieve a desired illumination pattern over window 208 and therefore may depend on the dimensions of window 208 as well as positioning of reflective segments 534 and 536 relative to light emitting elements 524A and 524B. Appropriate dimensions and radii of curvature may be selected empirically, through calculation or in any other suitable way. Also, it should be appreciated that sufficiently uniform illumination may be achieved without radiant energy density being exactly equal at all points across window 208. Some variation in illumination intensity may be unnoticeable in an image rendered by computer 102. In other instances, calibration techniques may be employed to compensate for variation in illumination across window 208. Accordingly, an illumination pattern that is sufficiently equal to provide good quality images after compensation techniques may be regarded as uniform, and dimensions of curved reflective segments 534 and 536 may be selected accordingly.

One or more curved reflective segments may also used to redirect light passing through window 208 in an optical path to image array 302. In this embodiment, light from window 208 impinges on curved reflective segment 530. The light reflects from curved reflective segment 530 and impinges upon curved reflective segment 532. From curved reflective segment 532, light is redirected through lens 522 to image array 302. In this example, curved reflective segments 530 and 532 are both concave. The concave shape of reflective segment 530 focuses light passing through window 208 onto reflective segment 532. For this reason, reflective segment 532 may have a smaller reflective area than the reflective area of reflective segment 530.

Upon reflection from reflective segment 532, light is further focused as it is redirected towards lens 522. In some embodiments, the focusing power provided by the concave shape of reflective segments 530 and 532 may focus light from window 208 into a sufficiently small area that the light may directly illuminate an area that is equal to or smaller than the area of image array 302. Though, in some embodiments, the focusing provided by reflective segments 530 and 532 may not be adequate and a lens, such as lens 522, may be employed. Though, the refractive power of lens 522 may be less than would be required without the focusing provided by reflective segment 530 and/or reflective segment 532. Accordingly, lens 522 may be of lower cost that would be required without the focusing provided by the concave shape of curved reflective segments 530 and 532.

In this example, curved reflective segments 530 and 532 are convex in cross section in a plane parallel to the X-Z plane and in cross section in a plane parallel to the Y-Z plane. In the example illustrated, the radii of curvature in each of these dimensions may be approximately equal. Such an embodiment may be useful, for example, if the active area of image array 302 has the same ratio of dimensions as window 208, even though image array 302 is smaller than window 208. In this scenario, approximately equal focusing power in the X and Y directions may be desirable. Though, it is not a requirement that the radii of curvature in each of these planes be equal. Rather, the radii of curvature may be selected such that the projection of window 208 upon image array 302 fits within the active area of image array 302.

FIG. 5B illustrates scanner-mouse 500 from an alternative perspective. In the view illustrated in FIG. 5B, lower surface 560 of lower outer housing portion 510B is visible. Though not illustrated in FIG. 5B, lower surface 560 may include openings for navigation sensors, such as navigation sensors 202 and 204 (FIG. 2). Other than for the inclusion of window 208, lower surface 560 may be a lower surface as in a conventional computer mouse.

Interior surface 550 of upper outer housing portion 510A is also visible in FIG. 5B. In the embodiment illustrated, the curved reflective segments 530, 532, 534 and 536 are each formed as separate components that are then attached to interior surface 550. The curved reflective segments 530, 532, 534 and 536 may be made in any suitable way. Those components could be formed from a metallic material that is polished on at least one surface. Alternatively, the components could be made by attaching a minor or other similarly reflective component in a holder for attachment. Though, in some embodiments, each of the components may be formed from plastic or other material that is easily formed into a desired shape. A surface of that component may then be coated to make it reflective. Conventional coating processes may be employed, including vapor deposition processes to form a reflective coating directly on the plastic or application of a conductive film through the use of adhesive or in any suitable way.

Regardless of how formed, the reflective segments may be coupled to upper outer housing portion 510A in any suitable way. In this example, interior surface 550 includes attachment features, such as attachment feature 552, that engage complementary attachment features on the reflective segments 530, 532, 534 and 536. In the embodiment illustrated, attachment feature 552 is a hole exposed in interior surface 550. Attachment feature 554 is a post adapted to fit within hole 552. The post may be held within the hole in any suitable way, including through the use of an interference fit, through the use of adhesives, welding, or any other suitable construction technique.

In the embodiment illustrated, each of the reflective segments includes attachment features similar to attachment feature 554 positioned to engage attachment features, similar to attachment feature 552, on lower surface 550. Though, it is not a requirement that all of the reflective segments be attached to the same portion of the outer housing or that all reflective segments be coupled to the outer housing in the same way.

FIG. 5B shows curved reflective segments 530, 532, 534 and 536 from a different perspective than in FIG. 5A. The convex nature of segments 534 and 536 and the concave nature of segments 530 and 532 are further evident in this view. The manner in which these segments interact to provide compact optical paths is further illustrated in FIGS. 6A, 6B and 6C.

FIG. 6A shows an alternative view of scanner-mouse 500. In the view of FIG. 6A, lower outer housing portion 510B is shown with printed circuit board 520 in place, reflective segments 530, 532, 534 and 536 are shown also in position. However, upper outer housing portion 510B is not illustrated such that optical paths within the interior of the outer housing are visible.

In the example of FIG. 6A, light entering the housing through window 208 travels along a segment $P_{1A}$ of an optical path to concave reflective segment 530. At concave reflective segment 530, the light is redirected and focused along segment $P_{1B}$ of the optical path. Segment $P_{1B}$ leads to concave reflective segment 532. From concave reflective segment 532, the light is again redirected and focused along segment $P_{1C}$. Segment $P_{1C}$ leads to lens 522.

FIG. 6B shows optical paths for light leaving light emitting elements, such as light emitting elements 524A and 524B, and leading to window 208. In this example, light travels from a light emitting element (not visible in FIG. 6B) along segment $P_{2A}$. Segment $P_{2A}$ leads to convex reflecting segment 534A, which, as described above, is convex in at least one aspect to spread light in the X direction. From convex reflective segment 534, light is redirected along segment $P_{2B}$ to window 208.

Similarly, light from a second light emitting element (not visible in FIG. 6B) travels along a segment (not visible in FIG. 6B) to convex reflective segment 536. Convex reflective segment 536 is convex in at least one aspect to spread the light in the X direction. At convex reflective segment 536, the light is redirected and spread along path $P_{3B}$. Segment $P_{3B}$ leads to window 208.

FIG. 6C illustrates a top view of lower outer housing portion 510B, in the configuration illustrated in FIGS. 6A and 6B. FIG. 6C illustrates the spreading of light along segments $P_{2B}$ and $P_{3B}$ from convex reflective segments 534 and 536, respectively. Similarly, FIG. 6C illustrates the focusing of light along segment $P_{1B}$ from concave reflective segment 530 towards concave reflective segment 532.

Additionally, from the view of FIG. 6C, the complex curvature of certain curved segments, particularly curved reflective segments 534 and 536, is visible. As can be seen in FIG. 6C, segments 534 and 536 are each convex along an axis parallel to the X direction. Though, curved reflective segments 534 and 536 are concave in the Y direction. This complex curvature provides for spreading the beam in the X direction, which corresponds to the elongated dimension of window 208, but provides focusing in the Y direction, which corresponds to the narrow dimension of window 208. Though, it should be appreciated that the nature of the complex curvature may depend on the shape of the window through which objects are imaged in combination with characteristics of the optical path between the light emitting elements and the window.

Figure 7B:
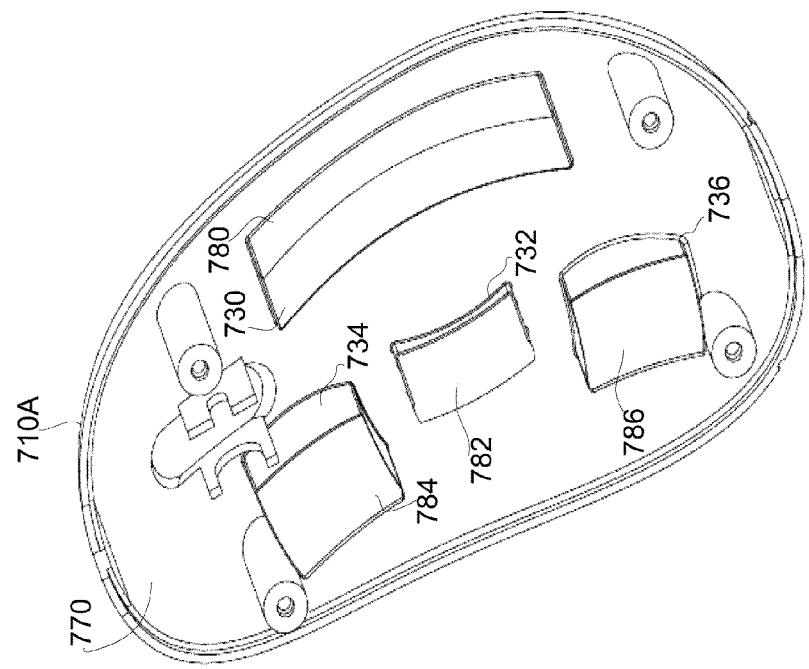
FIG. 7B is a sketch of a lower surface of an upper housing portion of the scanner-mouse of FIG. 7A.
Figure 7A:
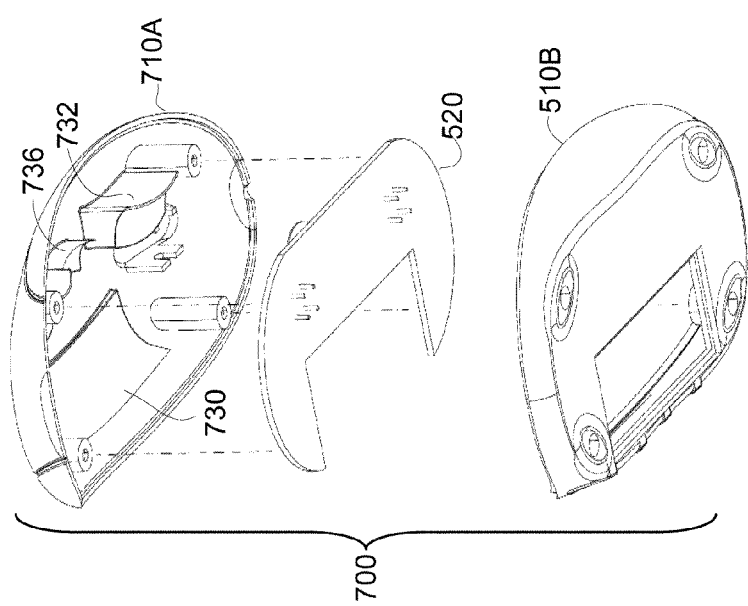
FIG. 7A is a sketch, partially exploded, of an alternative embodiment of a scanner-mouse.

FIGS. 5A, 5B, 6A, 6B and 6C illustrate one approach for incorporating curved reflective segments into a scanner-mouse, which may be employed in some embodiments. FIGS. 7A and 7B illustrate an alternative technique for incorporating curved reflective segments that may be employed in other embodiments. In the embodiment illustrated, scanner-mouse 700 has an outer housing that is shaped to provide the same form factor as the outer housing of scanner-mouse 500 (FIG. 5A). However, the form factor of the outer housing is not critical to the invention, and curved reflective segments may be incorporated into an outer housing of any suitable form factor.

In the embodiment illustrated in FIG. 7A, scanner-mouse 700 includes a lower outer housing in portion 510B that may be the same as in scanner-mouse 500. The circuitry and light emitting elements may also be the same as in scanner-mouse 500. Accordingly, scanner-mouse 700 is shown with printed circuit board 520 enclosed within the housing formed by lower outer housing portion 510B and upper outer housing portion 710A.

Scanner-mouse 700 similarly includes curved reflective segments to provide compact optical paths within the housing. However, in this embodiment, rather than forming reflective segments as separate components that are then coupled to the outer housing, curved reflective segments may be formed by first integrally forming curved segments with a housing portion and then applying a reflective coating to the curved segments. In FIG. 7A curved segments 730, 732 and 736 are visible. In FIG. 7B, illustrating an enlarged view of an interior surface 770 of upper outer housing portion 710A, curved segments 730, 732, 734 and 736 are also visible.

In this example, in which scanner-mouse 700 has the same form factor as scanner-mouse 500, the curved segments 730, 732, 734 and 736 each have an exposed surface that has the same shape as a reflective surface of one of the curved reflective members 530, 532, 534 and 536, respectively. That curved surface is covered with a reflective coating 780, 782, 784 or 786, respectively. Such a reflective coating may be formed in any suitable way, including though the use of techniques as are known in the art for forming reflective coatings. As an example, the reflective coatings 780, 782, 784 and 786 may be formed by attaching a film of metal or other reflective material to the curved segments 730, 732, 734 or 736. A film of metal may be attached with an adhesive or in any other suitable way. Though, as another alternative, a reflective coating may be applied to plastic or other material from which upper outer housing portion 710A is constructed using vapor coating techniques or other suitable deposition techniques to deposit a metallic layer or other suitably reflective coating on the curved segments.

Though curved reflective segments may be incorporated inside a housing of a scanner-mouse in any suitable way, integrally forming the curved segments with the housing may simplify manufacturing and therefore reduce cost of a scanner-mouse. However, in some instances, it may be desirable to provide flexibility in manufacturing a scanner-mouse. In the example of FIG. 8A, scanner-mouse 800 has the same form factor as scanner-mouse 500 (FIG. 5A). However, in this example, upper outer housing portion 810A is not customized in any way to incorporate components to provide compact optical paths within the housing of scanner-mouse 800. Rather, scanner-mouse 800 includes a separate component 850 to support curved reflective segments.

Figure 8B:
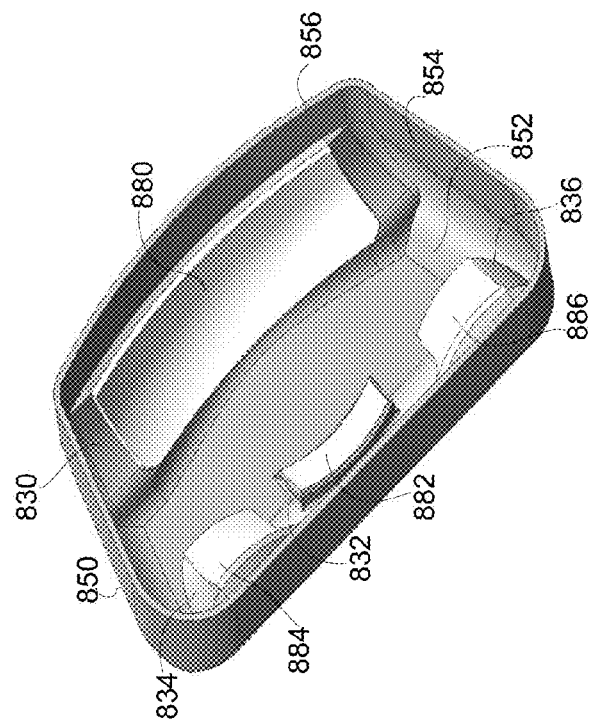
FIG. 8B is a sketch of a component of the scanner-mouse of FIG. 8A.
Figure 8A:
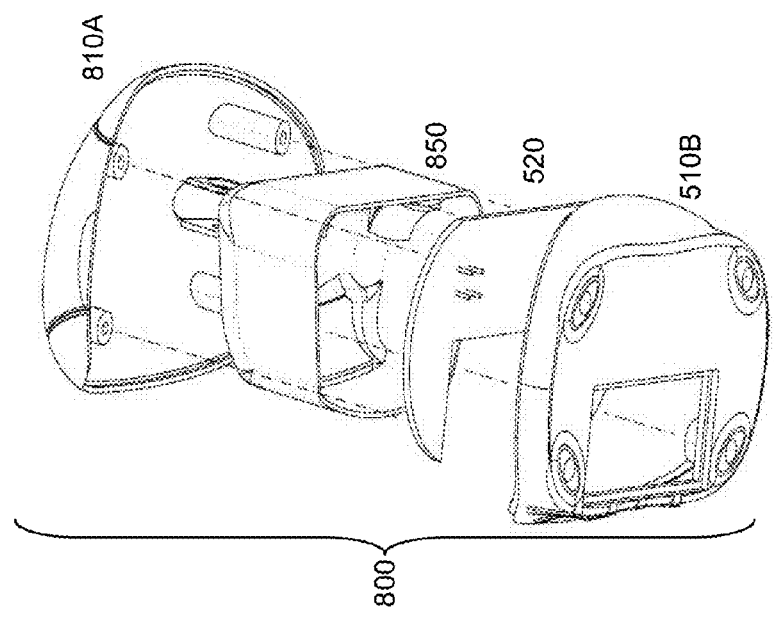
FIG. 8A is a sketch, partially exploded, of a further alternative embodiment of a scanner-mouse.

Component 850 is illustrated in FIG. 8B. Component 850 includes a top surface 852 and sidewalls 854 extending generally perpendicularly from the top surface. The sidewalls 854 have edges 856 that define a boundary to a cavity in component 850. Curved reflective segments are positioned within that cavity.

The curved reflective segments may be constructed in any suitable way, including using separable components as illustrated in FIG. 5A, which are then attached to component 850.

As an alternative, curved segments may be integrally formed with component 850 and then coated to provide reflective surfaces. In the embodiment illustrated in FIG. 8B, this latter approach is illustrated.

Component 850 may be manufactured by molding the top surface 852 and sidewalls 854 of a suitable material, such as plastic. As part of the molding operation, curved segments 830, 832, 834 and 836 may be formed within the cavity defined by top surface 852 and sidewalls 854. These segments may provide surfaces that have the same general shape as the reflective surfaces of curved reflective segments 530, 532, 534 and 536 (FIG. 5A). A reflective layer 880, 832, 834 and 836 may then be formed on these curved segments, providing a combination of concave and convex reflective segments that leads to compact optical paths as described in connection with FIGS. 5A and 5B, above.

Returning to FIG. 8A, scanner-mouse 800 may be assembled by inserting printed circuit board 520 into lower outer housing portion 510B and placing component 850 over printed circuit board 520. Upper outer housing portion 810A may then be secured to lower outer housing portion 510B. Securing the housing portions together may also serve to secure component 850 to the outer housing of scanner-mouse 800, thereby coupling the curved reflective segments within component 850 to the outer housing. Though, component 850 may be held within the outer housing of scanner-mouse 800 in any suitable way, including using adhesives, an interference fit, snap fit components or fasteners, such as screws.

In some embodiments, employing a separate component, such as component 850, to provide curved reflective segments may promote flexibility in manufacturing scanner-mouse 800. Upper outer housing portion 810A may be replaced by an upper outer housing portion of any suitable shape without impacting either the design or operation of scanner mouse 800. Accordingly, a manufacturer of a scanner-mouse may design upper outer housing portion 810A to have any desired shape and to incorporate any suitable control elements, such as buttons or a wheel. Such flexibility, for example, may allow a mouse manufacturer to have a line of mouse products, some of which include scanner-mouse functionality and some which do not. Alternatively, providing the curved reflective segments as part of a component separate from the housing allows mouse manufacturers to make cosmetic changes or functional changes to their products without the need to redesign components providing scan capabilities. As an additional benefit, components necessary to implement a scanner-mouse may be sold in a kit to mouse manufacturers. For example, a kit may include component 850 and may optionally include one or more other components, such as printed circuit board 520, with light emitting elements and an image array. By obtaining such a kit, a mouse manufacturer can readily incorporate scanning capability into a mouse.

A separate component, such as component 850 may also provide operational benefits. By enclosing the optical path within a cavity in component 850, the optical path may be better shielded from ambient light, which may improve image quality. Additionally, by enclosing the optical path within the cavity formed by component 850, the components are better shielded from dust and other contaminants, which may further improve image quality.

Having thus described several aspects of at least one embodiment of this invention, it is to be appreciated that various alterations, modifications, and improvements will readily occur to those skilled in the art.

For example, embodiments are described in which separate curved reflective segments are incorporated into optical paths within a scanner-mouse. However, it is not a requirement that each curved reflective segment be implemented as a separate component. As illustrated in FIG. 8B, curved segments 832, 834 and 836 are disposed along one side of the housing. These curved segments need not be separately identifiable and could run together into a continuous segment, with a continuous reflective coating. Also, FIG. 8B shows that on the opposite side of the housing, curved segment 830 is formed, with separate regions of reflective coating formed on each side of the housing. However, embodiments are possible in which the curved segments on opposing sides of the housing run together and have continuous reflective coating.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a non-transitory computer readable medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semi-conductor devices, or other non-transitory, tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that performs particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. Apparatus for use as a hand-held scanner, comprising:
   a housing comprising a lower surface with a window therethrough and a domed upper outer surface shaped to conform to a human hand;
   a circuit board positioned within the housing adjacent the lower surface, the circuit board comprising:
      an upper surface;
      a light emitting component mounted to the upper surface, the light emitting component being adapted and configured to emit light to illuminate the window; and
      an image array mounted to the upper surface;
   a concave reflective segment coupled to the housing in a location such that the concave reflective segment redirects and focuses light passing through the window in an optical path to the image array; and
   a convex reflective segment coupled to the housing in a location such that the convex reflective segment redirects and spreads light emitted from the light emitting component in an optical path to the window; wherein the concave reflective segment and the convex reflective segment are located within the housing between the domed upper outer surface of the housing and the upper surface of the circuit board.

2. The apparatus of claim 1, wherein:
   the concave reflective segment is a first concave reflective segment;
   the location is a first location; and
   the apparatus further comprises:
      a second concave reflective segment coupled to the housing in a second location such that the second concave reflective segment redirects and focuses light from the first concave reflective segment in the optical path to the image array.

3. The apparatus of claim 2, wherein the second concave reflective segment redirects and focuses the light from the first concave reflective segment onto the image array.

4. The apparatus of claim 2, wherein:
   the convex reflective segment is a first convex reflective segment;
   the light emitting component is a first light emitting component;
   the optical path to the window is a first optical path to the window; and
   the apparatus further comprises:
      a second light emitting component mounted to the upper surface; and
      a second convex reflective segment coupled to the housing in a fourth location such that the second convex reflective segment redirects and spreads light emitted from the second light emitting component in a second optical path to the window.

5. The apparatus of claim 4, wherein the first concave reflective segment, the second concave reflective segment, the first convex reflective segment and the second convex reflective segment each comprises a separate member comprising a reflective surface fastened to the housing.

6. The apparatus of claim 2, wherein:
   the second concave reflective segment is larger than the first concave reflective segment.

7. The apparatus of claim 1, wherein the printed circuit board comprises a cutout aligned with the window.

8. The apparatus of claim 1, wherein:
   the housing comprises an upper portion and a lower portion;
   the upper portion comprising the domed upper outer surface; and
   the lower portion comprising the lower surface.

9. The apparatus of claim 1, wherein the concave reflective segment comprises a film deposited on a surface of the housing.

10. Apparatus for use as a scanner-mouse, the apparatus comprising:
a housing comprising a lower surface, the lower surface having a window formed therein;
a circuit assembly positioned within the housing adjacent to the lower surface, the circuit assembly comprising:
an upper surface parallel to the lower surface,
an image array disposed on the upper surface; and
a light emitting element disposed on the upper surface;
a first reflective segment within the housing, the first reflective segment being shaped and positioned to reflect and focus light passing through the window in an optical path to the image array; and
a second reflective segment within the housing, the second reflective segment being shaped and positioned to reflect and spread light from the light emitting element in the optical path to the window; wherein the first reflective segment and the second reflective segment are located within the housing and above the upper surface of the circuit assembly.

11. The apparatus of claim 10, wherein the optical path is a first optical path, the first optical path comprises a third reflective segment disposed in the first optical path to the image array, the third reflective element being disposed in the first optical path between the first reflective segment and the image array.

12. The apparatus of claim 11, wherein:
the light emitting element is a first light emitting element;
the apparatus further comprises:
a second light emitting element disposed on the upper surface;
a fourth reflective segment within the housing, the fourth reflective segment being shaped and positioned to reflect and spread light from the second light emitting element in a second optical path to the window.

13. The apparatus of claim 12, wherein:
the second reflective segment, the third reflective segment and the fourth reflective segment are positioned along a first side of the housing; and
the first reflective element is positioned on a second side of the housing, opposite the first side.

14. The apparatus of claim 13, wherein:
the first and third reflective segments are concave, with the first reflective segment being larger than the third reflective segment; and
the second and fourth reflective segments are convex.

15. The apparatus of claim 10, wherein the circuit assembly comprises a printed circuit board and the housing encloses a single printed circuit board.

16. Components for use in a computer peripheral for use as a scanner-mouse, comprising:
a first component comprising:
a top surface;
side walls extending from the top surface, the top surface and side walls bounding a cavity, with edges of the side walls defining an opening to the cavity;
a first concave reflective segment disposed within the cavity;
a second concave reflective segment disposed within the cavity;
a first convex reflective segment disposed within the cavity; and
a second convex reflective segment disposed within the cavity; and
a printed circuit board having an upper surface sized to fit within the opening of the cavity, the printed circuit board comprising:
a first light emitting component mounted on the upper surface;
a second light emitting component mounted on the upper surface; and
an image array mounted on the upper surface,
wherein, when the printed circuit board is positioned in the opening of the cavity:
the first concave reflective segment is shaped and positioned to reflect light from a region of the opening of the cavity toward the second concave reflective segment;
the second concave reflective segment is shaped and positioned to reflect light from the first concave reflective segment toward the image array;
the first convex reflective segment is shaped and positioned to reflect light from the first light emitting component toward the region of the opening of the cavity;
the second convex reflective segment is shaped and positioned to reflect light from the second light emitting component toward the region of the opening of the cavity; wherein first concave reflective segment, the second concave reflective segment, the first convex reflective segment, and the second convex reflective segment are located within the cavity and above the upper surface of the printed circuit board.

17. The component of claim 16, wherein:
the top surface and side walls are integrally formed of plastic.

18. The component of claim 17, wherein:
the first concave reflective segment comprises a first concave segment integrally formed with the top surface and side walls and a reflective coating;
the second concave reflective segment comprises a second concave segment integrally formed with the top surface and side walls and a reflective coating;
the first convex reflective segment comprises a first convex segment integrally formed with the top surface and side walls and a reflective coating; and
the second convex reflective segment comprises a second convex segment integrally formed with the top surface and side walls and a reflective coating.

19. The components of claim 16 in a combination forming a scanner-mouse, the combination comprising:
an outer housing, enclosing the component and the printed circuit board, the outer housing having dimensions conforming to the shape of a human hand and at least one user operable control on the exterior surface.

20. The components of claim 16, wherein:
the second concave reflective surface is larger than the first concave reflective surface.

* * * * *